Jan. 10, 1928.                     1,655,757
S. A. CRONE
RAILWAY BRAKE BEAM SUPPORT
Filed Oct. 23, 1925          2 Sheets-Sheet 1
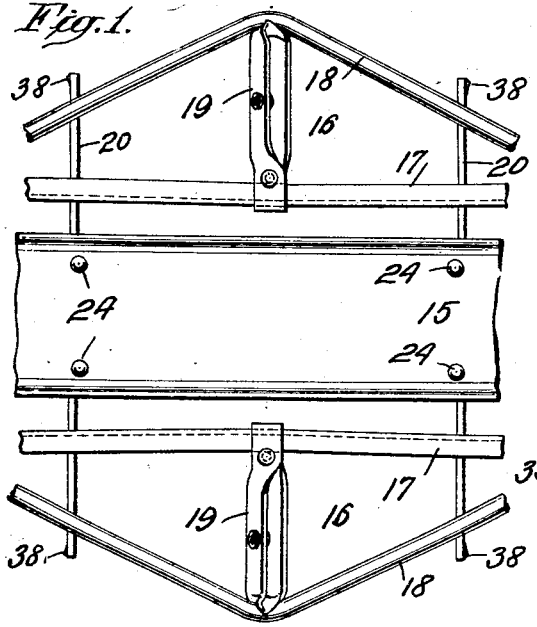
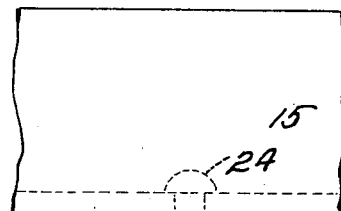
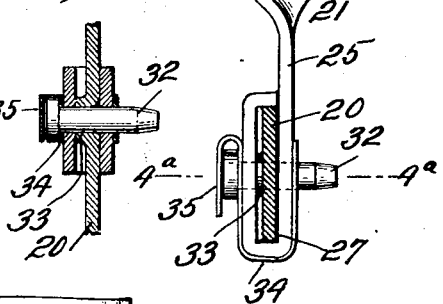
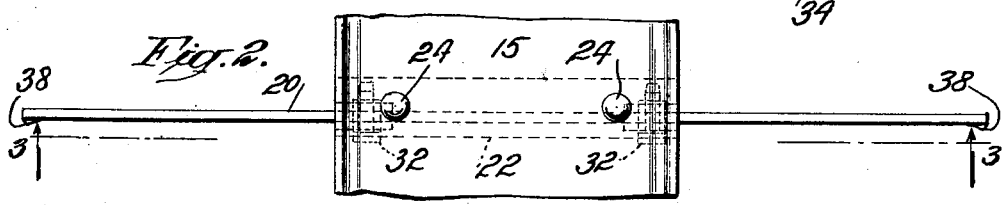
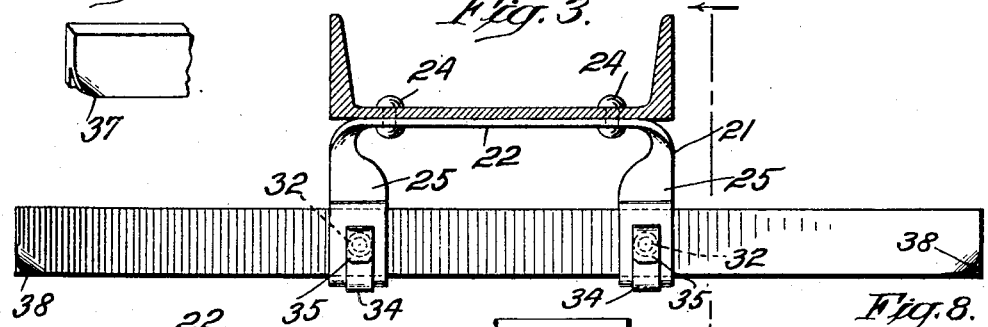
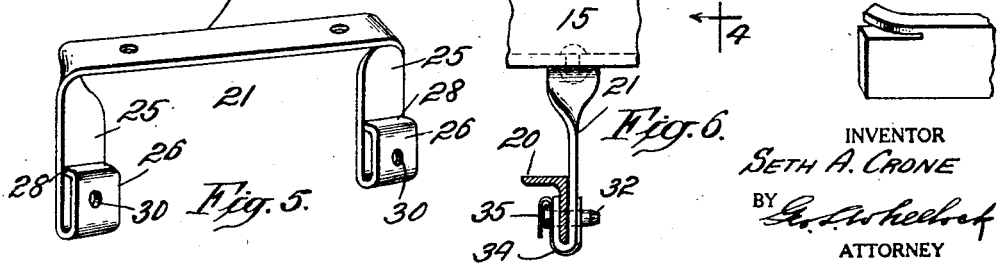
INVENTOR
SETH A. CRONE
BY G. Wheelock
ATTORNEY Jan. 10, 1928.
S. A. CRONE
1,655,757
RAILWAY BRAKE BEAM SUPPORT
Filed Oct. 23, 1925    2 Sheets-Sheet 2
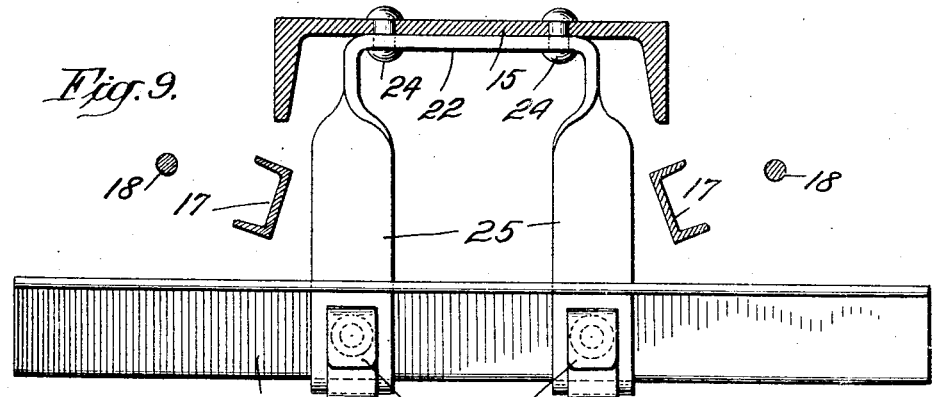
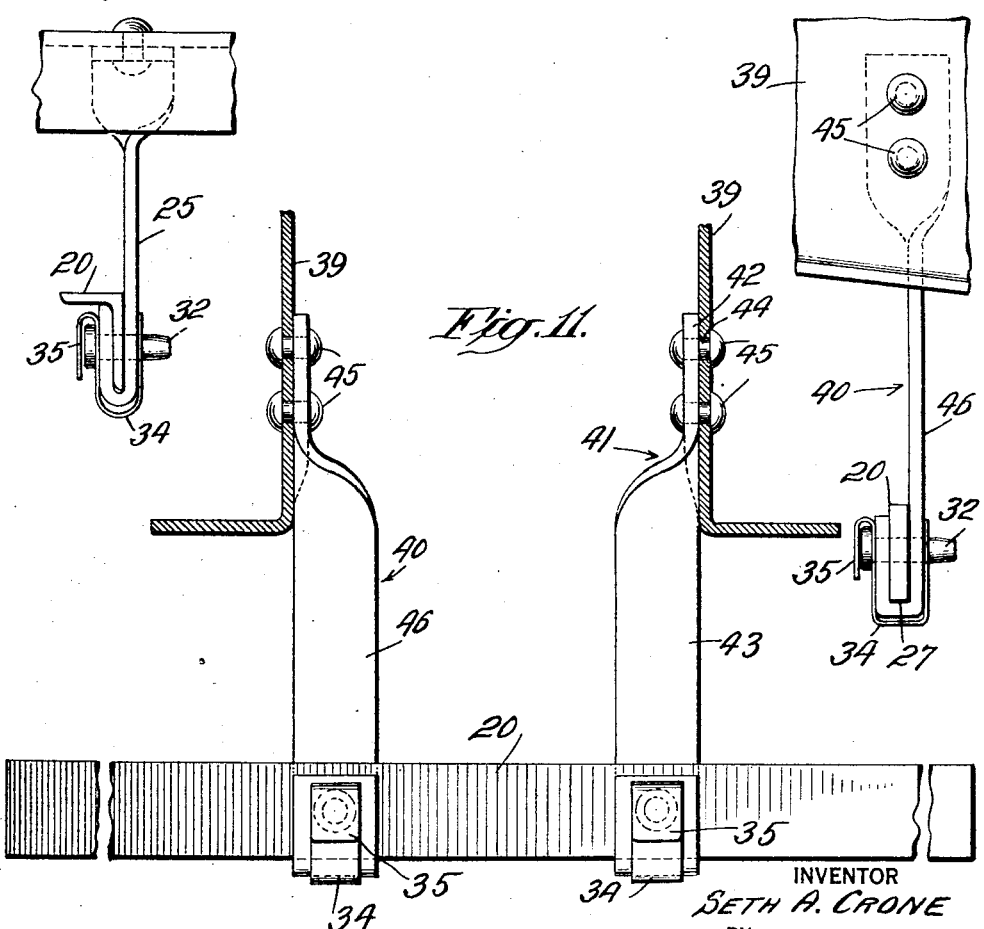
INVENTOR
SETH A. CRONE
BY
Geo. L. Wheelock
ATTORNEY Patented Jan. 10, 1928.

1,655,757

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

RAILWAY-BRAKE-BEAM SUPPORT.

Application filed October 23, 1925. Serial No. 64,299.

The present invention relates to railway brake-beam supports and particularly to emergency supports applied to the spring plank or other portions of a car-truck for supporting the brake-beams in cases of emergency to prevent their falling beneath the wheels of the truck.

The invention about to be described is of particular utility in connection with trussed brake-beams hung transversely of a car-truck on opposite sides of the spring plank substantially parallel thereto, and contemplates the attachment of suitable safety supporting bars by means of a pair of depending arms having their upper ends attached to the framework with their lower ends twisted and bent upwardly to form a pair of aligned seats to accommodate the safety bars, which extend under the brake-beams transversely of the spring plank. The length of the safety bars is such that should the brake-beams become unhung, they will be supported and prevented from falling under the wheels of the car truck, thereby preventing derailment or other damage. Suitable pins are inserted through apertures in the safety bars and in the ends of the arms to engage and lock the safety bars in position.

An object of the present invention is to provide an inexpensive emergency safety support adapted to prevent the loss of brake-beams and brake-shoes under any circumstances; to support positively any brake-beams which may be accidently dislocated until the breakage may be repaired, and to prevent such broken parts from falling under the wheels of the car-truck.

Another object of the invention is to provide a simple and inexpensive supporting means by utilizing a strip of metal attached to the spring plank at its center portion with its respective ends twisted through an angle of substantially ninety degrees and bent downwardly and upwardly to form a pair of aligned seats into which a safety bar may be mounted.

Other and further objects of the invention will be obvious upon an understanding of the illustrated embodiment about to be described, or indicated in the appended claims, and various advantages secured by the invention other than those herein specifically set forth will occur to one skilled in the art, or become evident upon the employment of the invention in practice.

A preferred embodiment of the invention has been selected for purposes of illustration and description, and is shown in the accompanying drawings, wherein Fig. 1 is a top plan view of a portion of a car-truck illustrating the present invention applied to the spring plank;

Fig. 2 is a detailed plan view of a safety bar attached to the spring plank;

Fig. 3 is a cross-sectional view along the line 3—3 of Fig. 2, showing details of the support;

Fig. 4 is a cross-sectional view along the line 4—4 of Fig. 3;

Fig. 4$^a$ is a cross-sectional view along the line 4$^a$—4$^a$ of Fig. 4, showing details of the apertures in the safety bars;

Fig. 5 is a perspective view of the supporting member;

Fig. 6 is a detailed view illustrating the present invention applied to a safety angle bar;

Fig. 7 is a detailed view of the end of a safety bar illustrating one way of forming locking lugs thereon to prevent accidental removal of the bar from the supports;

Fig. 8 illustrates another form of locking lugs on the ends of the bars;

Fig. 9 is an end view illustrating the application of the present invention to an inverted spring plank;

Fig. 10 is a detailed side view of the mechanism shown in Fig. 9;

Fig. 11 is an end view illustrating the application of the present invention to the transoms in pressed steel car-trucks; and Fig. 12 is a side view of the application shown in Fig. 11.

Referring more particularly to Figs. 1 to 8 of the drawings, there is shown a spring plank 15 of the well known channel form, with the usual type of inside hung trussed brake-beams 16 on the respective sides thereof, comprising a compression member 17, a tension member 18, and a strut 19, extending transversely of the central portions of the members, and adapted to be attached to brake-applying devices not shown. It will be understood that at the juncture of the respective ends of the tension and compression members 17 and 18 of the brake-beams, brake-shoes are attached and hung from some part of the car structure for engagement with the four wheels of the truck, when pressure is applied to move the brake-beams away from the spring plank.

To prevent the brake-beams and the brake-shoes from being lost or from causing derailment or other damage by falling beneath the trucks, there are usually provided a pair of emergency supporting members 20 mounted on opposite sides of the car-truck and preferably attached to the spring plank 15. The length of the safety bars is such that their respective ends extend under the brake-beams sufficiently far to engage them in case of accidental derangement and to prevent their falling from the ends thereof under any circumstances. Due to the compactness of the truck and the short distance between the respective pairs of wheels, the brake-beams cannot move far from the spring plank without engaging the flanges of the wheels.

The present invention relates more particularly to an improved means for securing the safety bars rigidly in position and contemplates the provision of a supporting member 21 which has a flat horizontal portion 22 adapted to be riveted to the bottom of the spring plank 15 by means of rivets 24. The free ends 25 of the supporting member are preferably twisted through an angle of substantially ninety degrees and bent downwardly to form depending arms, having their surfaces aligned transversely of the spring plank. The extremities of the arms are bent upwardly at 26 to form seats 27 into which the safety bars 20 may be mounted and retained rigidly in their upright position, so that they may be edgewise disposed to the brake-beams and thereby afford maximum strength for a given size. The ends of the seat forming portion 26 are preferably flanged over the safety bars at 28 to encircle and positively hold them in position. Suitable apertures 30 are formed in the arms 25 and their upwardly extending portions 26 to cooperate with apertures 31 in the safety bars to permit the insertion of a pin 32 to lock them firmly in position. Excessive wear on the safety bar locking pins due to the constant vibration of the parts may be minimized by providing extended wear surfaces adjacent the apertures 31 by striking the peripheries thereof outwardly to form bosses 33 as shown in Fig. 4ª.

To prevent accidental removal of the pin, a U-shaped holding member 34 is provided having apertures adjacent its respective ends to register with the apertures in the arms 25 when fitted thereabout so that the pin 32 may be inserted therethrough. One leg of the holding member is prolonged so that it may be bent over the head of the pin as shown at 35 to prevent loss thereof.

As a further precaution against loss of the safety bar, the ends thereof are slitted as shown at 37 with the slitted portions bent outwardly to form lugs 38. It will be noted in Fig. 7 that a portion is slitted from the side of the bar while in Fig. 8 the same result is accomplished by slitting a portion from the edge of the bar and bending it outwardly from the plane thereof. Should the pin 32 by any chance be lost, even then it would be impossible to remove the safety bars from their seats until the lugs have been bent back into place.

In Fig. 6 of the drawings, the present invention is shown applied to a safety angle bar which is designated by the numeral 20 although it differs in form from the safety bars shown in Fig. 1. The supporting member 21 differs from that described above in that the extremities of the arms are not flanged as shown at 28 but are left open to permit one side of the angle bar to fit snugly therein with the other side extending outwardly over the extremity of the portion 26. Pins 32 are inserted in the ends of the arms 25 and through apertures in the angle bars as described hereinbefore. The principal advantages of this type of bar is to afford greater strength, particularly in a lateral direction, and to prevent bending.

In certain types of car-trucks, the spring plank is inverted as shown in Fig. 9. The present invention may be applied to such a construction by shortening the horizontal portion 22 of supporting member 21 and permitting the additional metal to be added to the arms 25 so that the safety bars will be substantially the same distance from the brake-beams as when the spring plank is in its upright position. It will be noted in Figs. 9 and 10 that angle bars are used and the construction of the ends of the arms 25 is similar to that shown in Fig. 6 and described above.

In Figs. 11 and 12, one form of the present invention is shown applied to transoms such as are found in pressed steel trucks. Such transoms usually comprise a pair of channel members extending transversely of the car-truck somewhat similarly to the spring plank described hereinbefore with the channels extending outwardly furnishing a pair of vertical surfaces spaced from each other as shown in Fig. 11. A pair of members 40 formed from strip metal have their upper ends twisted at 41 about the edge 43 as an axis to furnish a pair of flat surfaces 42 adapted to fit against the transoms 39. Suitable apertures 44 are formed in the transoms and in the members whereby the one may be secured to the other by the rivets 45. The lower portions 46 of the supporting members depend downwardly to form arms which are bent upwardly at their lower extremities to form seats 27 as shown in Fig. 6.

The safety bars 20 mounted in the seats in this form of the invention are not completely encircled as shown in Fig. 4 but are left open at their upper edges to facilitate insertion and removal thereof. The holding member 34 retains the pin 32 in position as described hereinbefore.

It will be seen that the present invention is very inexpensive in construction and easy to manufacture from readily obtainable material, and effectively secures a safety bar in proper position without danger of its becoming loosened or deranged under any circumstances. The bars are adapted to engage fallen brake-beams at two points and hold them in a position between the car wheels and the spring plank. All parts of the device are rugged in construction, and securely and rigidly fixed to each other to withstand the rough usage that devices of this general character encounter. The invention is applicable to spring planks in inverted positions or otherwise, to transoms or to any other part of the framework of the car, thereby rendering it adaptable to all types of car-trucks.

As various embodiments may be made in the invention above described, it is to be understood that all matter herein set forth is to be interpreted as illustrative and not in a limited sense.

Having thus described my invention, I claim:—

1. In a car-truck having a spring plank and inside hung brake-beams, the combination of a supporting member having a horizontal portion with a pair of depending arms turned through an angle of substantially ninety degrees to present a flat surface to a safety bar extending transversely of said spring plank, means for securing said horizontal portion to the bottom of said spring plank, the lower ends of said arms being bent upwardly to form a pair of seats, and a safety bar in said seats.

2. In a car-truck having a spring plank and inside hung brake-beams, the combination of supporting members comprising depending metallic strips, means for securing the upper ends of the strips to the spring plank, the lower ends of said strips being twisted into a common plane extending transversely of said spring plank and bent upwardly at their lower extremities to facilitate the attachment of a safety bar thereto.

3. A supporting member for safety bars adapted to be attached to the framework of a car-truck, comprising a strip of metal having its ends twisted with respect to the center portion of the strip, said ends being bent downwardly to provide flat faces and the extremities of the ends being bent upwardly to form seats for a safety bar.

4. A supporting member for safety bars adapted to be attached to the framework of a car-truck, comprising a strip of metal having its ends twisted through an angle of substantially ninety degrees with respect to the center portion of the strip, said ends being bent downwardly to provide flat aligned surfaces, and seats formed at the extremities of said ends to receive a safety bar.

5. A supporting member for safety bars adapted to be attached to the framework of a car-truck, comprising a strip of metal having each of two connected portions twisted with respect to each of two other portions of the strip, each of two said portions being adapted to be secured to the framework of a car truck, and each of the other portions extending downwardly therefrom, and having its extremity adapted to provide a seat to receive a safety bar, and the two seats extending in substantially the same direction as the connection between the first two strip portions.

6. A safety bar adapted to furnish emergency support for brake-beams, comprising a metallic strip adapted to be edgewise disposed to brake-beams, said strip having a pair of apertures formed with integral wear surfaces struck from the peripheries thereof to prevent excessive wear on the pin adapted to be inserted therein.

7. In a device of the class described, the combination of an emergency support for brake-beams, comprising depending supporting arms attached at their upper ends to the framework of a car-truck, their lower ends being bent upwardly to form seats, safety bars in said seats having apertures formed with wear surfaces struck from the peripheries thereof, and means extending through said apertures to secure said bar in position.

8. In a device of the class described, the combination of an emergency support for brake-beams, comprising depending supporting arms attached at their upper ends to the framework of a car-truck, their lower ends being bent upwardly to form seats, and having apertures to receive a pin, a safety bar in said seats having apertures formed with bosses adjacent the peripheries thereof to provide extended wear surfaces, pins extending through the apertures in said arms and the apertures in said bar to secure same rigidly in position, and means for securing said pin in position.

9. In a device of the class described, the combination of an emergency support for brake-beams, comprising a metallic strip having one portion twisted through an angle of substantially ninety degrees with respect to another portion, means for securing one portion of the support to the framework of the car-truck, such twist locating the other portion inwardly with respect to the outer side of the framework, and the extremity of the other said portion being bent upwardly to form a seat underneath the framework and having aligned apertures therein, a safety bar mounted in said seat with an aperture therein adjacent said other apertures, and a pin extending therethrough to lock said bar in position.

10. In a car-truck having inside hung brake-beams, the combination of a pair of depending arms attached at their upper ends to the framework of the car-truck with their lower ends twisted through an angle of substantially ninety degrees to present aligned surfaces longitudinally of said car-truck and free from projection beyond the confines of the framework, the lower extremities of said arms being bent upwardly to form a pair of seats, and a safety bar in said seats.

SETH A. CRONE.